(12) United States Patent
Abe

(10) Patent No.: US 9,589,339 B2
(45) Date of Patent: Mar. 7, 2017

(54) IMAGE PROCESSING APPARATUS AND CONTROL METHOD THEREFOR

(71) Applicant: CANON KABUSHIKI KAISHA, Tokyo (JP)

(72) Inventor: Takahiro Abe, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 458 days.

(21) Appl. No.: 13/804,966

(22) Filed: Mar. 14, 2013

(65) Prior Publication Data
US 2013/0265412 A1    Oct. 10, 2013

(30) Foreign Application Priority Data

Apr. 4, 2012 (JP) ................................ 2012-085889

(51) Int. Cl.
*G06T 7/00* (2006.01)
*G06T 7/20* (2006.01)
*H04N 5/232* (2006.01)
*H04N 5/235* (2006.01)

(52) U.S. Cl.
CPC .......... *G06T 7/0004* (2013.01); *G06T 7/2013* (2013.01); *H04N 5/2354* (2013.01); *H04N 5/23232* (2013.01); *G06T 2207/10152* (2013.01); *G06T 2207/20021* (2013.01)

(58) Field of Classification Search
CPC ....... G06K 9/46; H04N 5/2256; G06T 7/0081
See application file for complete search history.

(56) References Cited

U.S. PATENT DOCUMENTS

2009/0256918 A1* 10/2009 Rabinowitz .......... G02B 27/646
                                                                 348/208.4
2010/0245609 A1*  9/2010 Estevez ..................... 348/222.1

FOREIGN PATENT DOCUMENTS

| CN | 101729792 A  | 6/2010 |
|----|--------------|--------|
| JP | 2004-221992 A | 8/2004 |
| JP | 2005-130268 A | 5/2005 |
| JP | 2007-060166 A | 3/2007 |
| JP | 2010-026284 A | 2/2010 |
| JP | 2011-013890 A | 1/2011 |

OTHER PUBLICATIONS

Japanese Office Action issued in corresponding application No. 2012-085889 on May 19, 2014.
Chinese office action issued in corresponding application No. 201310115939.8 on Dec. 8, 2015.

* cited by examiner

*Primary Examiner* — Zhubing Ren
(74) *Attorney, Agent, or Firm* — Carter, DeLuca, Farrell & Schmidt, LLP

(57) ABSTRACT

An image captured with flash light and an image captured without flash light are each divided into a plurality of regions, and a luminance value is calculated for each region. Based on a ratio of a difference between the luminance value of each region in the image captured with flash light and the luminance value of the corresponding region in the image captured without flash light to the luminance value of the corresponding region in the image captured without flash light, a degree of influence of light representing the influence of light emitted by the light emitting device on the luminance value of each region in the image captured with flash light is calculated. Regions in which the degrees of influence of light are larger than a predetermined threshold are determined as illuminated regions.

9 Claims, 13 Drawing Sheets

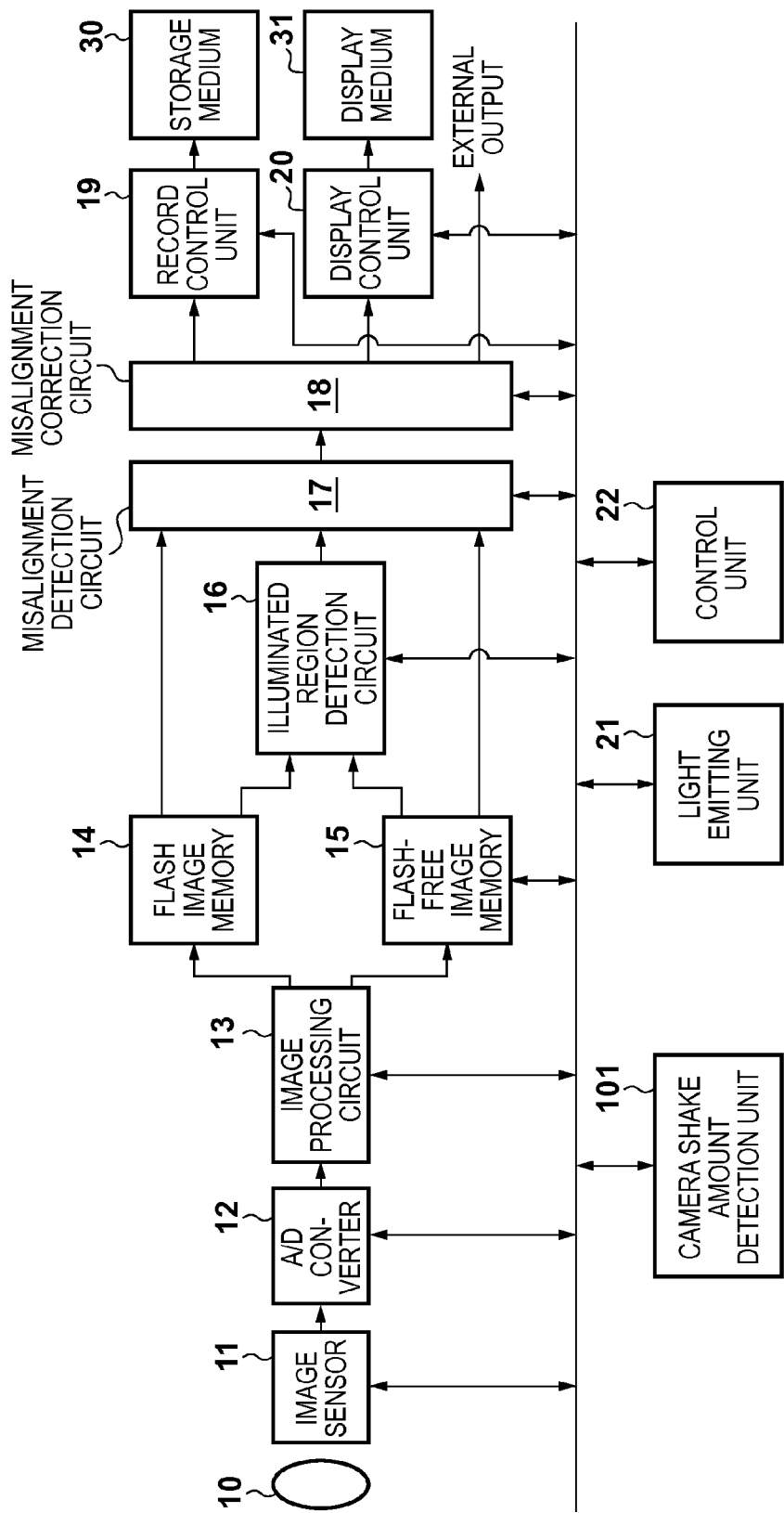

FIG. 3A
FIG. 3B
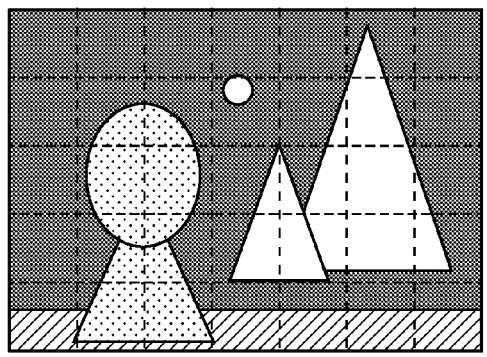
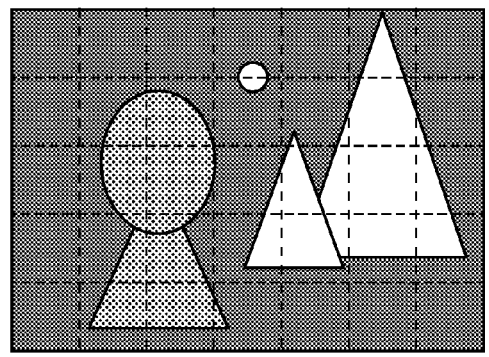
☐ REGION ILLUMINATED BY
    INTENSE FLASH LIGHT
☐ REGION ILLUMINATED BY
    WEAK FLASH LIGHT FIG. 5A
FIG. 5B
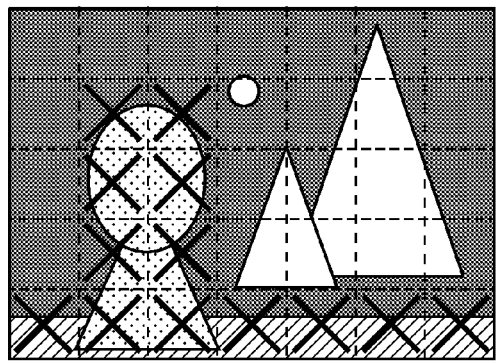
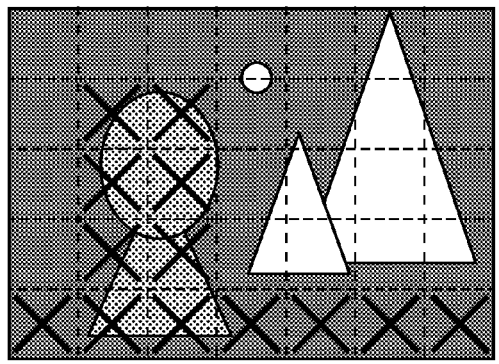

⌐---┐ SIZE OF BLOCKS BASED ON
¦   ¦ WHICH INTEGRATED VALUE OF
└---┘ LUMINANCE IS CALCULATED

☐ SIZE OF BLOCKS BASED ON
  WHICH SAD OF LUMINANCE
  IS CALCULATED

⌐---┐ SIZE OF BLOCKS BASED ON
¦   ¦ WHICH INTEGRATED VALUE OF
└---┘ LUMINANCE IS CALCULATED

☐ SIZE OF BLOCKS BASED ON
  WHICH SAD OF LUMINANCE
  IS CALCULATED

FIG. 10
 SIZE OF BLOCKS BASED ON WHICH INTEGRATED VALUE OF LUMINANCE IS CALCULATED
 SIZE OF BLOCKS BASED ON WHICH SAD OF LUMINANCE IS CALCULATED
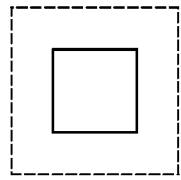
10a
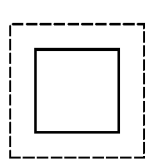
10b
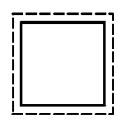
10c
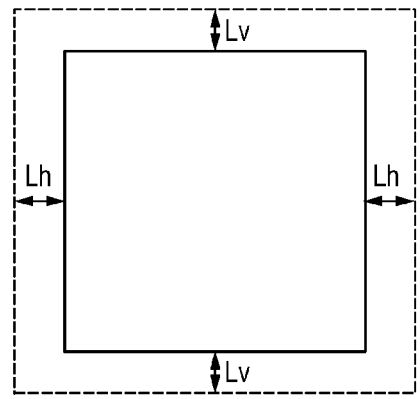
10d

- REGION ILLUMINATED BY INTENSE FLASH LIGHT
- REGION ILLUMINATED BY WEAK FLASH LIGHT
- OBJECT WITH HIGH LUMINANCE

- OBJECT WITH HIGH LUMINANCE

IMAGE PROCESSING APPARATUS AND CONTROL METHOD THEREFOR

BACKGROUND OF THE INVENTION

Field of the Invention

The present invention relates to an image processing apparatus and a control method therefor, and in particular to technology for aligning (or correcting misalignment of) a plurality of pieces of image data.

Description of the Related Art

In recent years, a method for generating a single image by synthesizing images obtained by capturing a scene multiple times has been suggested. The purpose of this method is to, for example, increase the dynamic range of a solid-state image sensor, reduce noise, and suppress camera shakes in a television camera, an electronic still camera, and the like.

When a scene is captured multiple times while holding a camera by hand, the obtained plurality of images exhibit misalignment attributed to the influence of camera shakes. Therefore, the obtained plurality of images are synthesized after correcting the misalignment (being aligned). The misalignment can be detected as, for example, a motion vector between images.

When aligning an image captured with flash light with an image captured without flash light using a motion vector detected between the images, there is a possibility that the motion vector cannot be detected appropriately. Note that the former image denotes an image that light was emitted by a flash within a period in which the image being captured (i.e., an image sensor being exposed), and the latter image denotes an image that no light was emitted by the flash within a period in which the image being captured. When using a misalignment detection method whereby light emitted by the flash influences the result of detection, it is preferable not to use information of regions illuminated by flash light.

Japanese Patent Laid-Open No. 2010-26284 discloses technology for, when performing the alignment by detecting a motion vector of characteristic points, improving the accuracy of detection of the motion vector using an image captured with flash light.

SUMMARY OF THE INVENTION

The present invention provides an image processing apparatus and a control method for improving the accuracy of alignment when synthesizing an image captured with flash light, which is light emitted by a light emitting device, and an image captured without flash light.

According to an aspect of the present invention, there is provided an image processing apparatus comprising: an acquisition unit that acquires a first image captured with light emitted by a light emitting device and a second image captured without light emitted by the light emitting device; a luminance calculation unit that calculates a luminance value of the first image and the second image that have each been divided into a plurality of regions for each region; an influence degree calculation unit that calculates, for each region in the first image, a degree of influence of light representing influence of light emitted by the light emitting device on the luminance value of the region; and an illuminated region detection unit that detects illuminated regions illuminated by light emitted by the light emitting device from the first image based on the degrees of influence of light.

According to another aspect of the present invention, there is provided an image capturing apparatus comprising: the image processing apparatus according to present invention; an image capturing unit; the light emitting device; and a control unit that controls the image capturing unit and the light emitting device to obtain the first image and the second image through image capture.

According to further aspect of the present invention, there is provided a control method for an image processing apparatus, comprising: an acquisition step of acquiring a first image captured with light emitted in a light emitting step and a second image captured without light emitted in the light emitting step; a luminance calculation step of calculating a luminance value of the first image and the second image that have each been divided into a plurality of regions for each region; an influence degree calculation step of calculating, for each region in the first image, a degree of influence of light representing influence of light emitted in the light emitting step on the luminance value of the region; and an illuminated region detection step of detecting illuminated regions illuminated by light emitted in the light emitting step from the first image based on the degrees of influence of light.

Further features of the present invention will become apparent from the following description of exemplary embodiments with reference to the attached drawings.

BRIEF DESCRIPTION OF THE DRAWINGS

FIG. 1 is a block diagram showing an example of a functional configuration according to signal processing of a digital camera, which is one example of an image processing apparatus according to an embodiment of the present invention.

FIGS. 3A and 3B respectively show examples of an image captured with flash light and an image captured without flash light that are divided into blocks in the first embodiment of the present invention.

FIGS. 5A and 5B show examples of the results of detection by the illuminated region detection circuit according to the first embodiment of the present invention.

FIG. 10 shows examples in which the size of blocks for which an integrated value of luminance is calculated is changed in the fourth embodiment of the present invention.

DESCRIPTION OF THE EMBODIMENTS

Figure 2A:
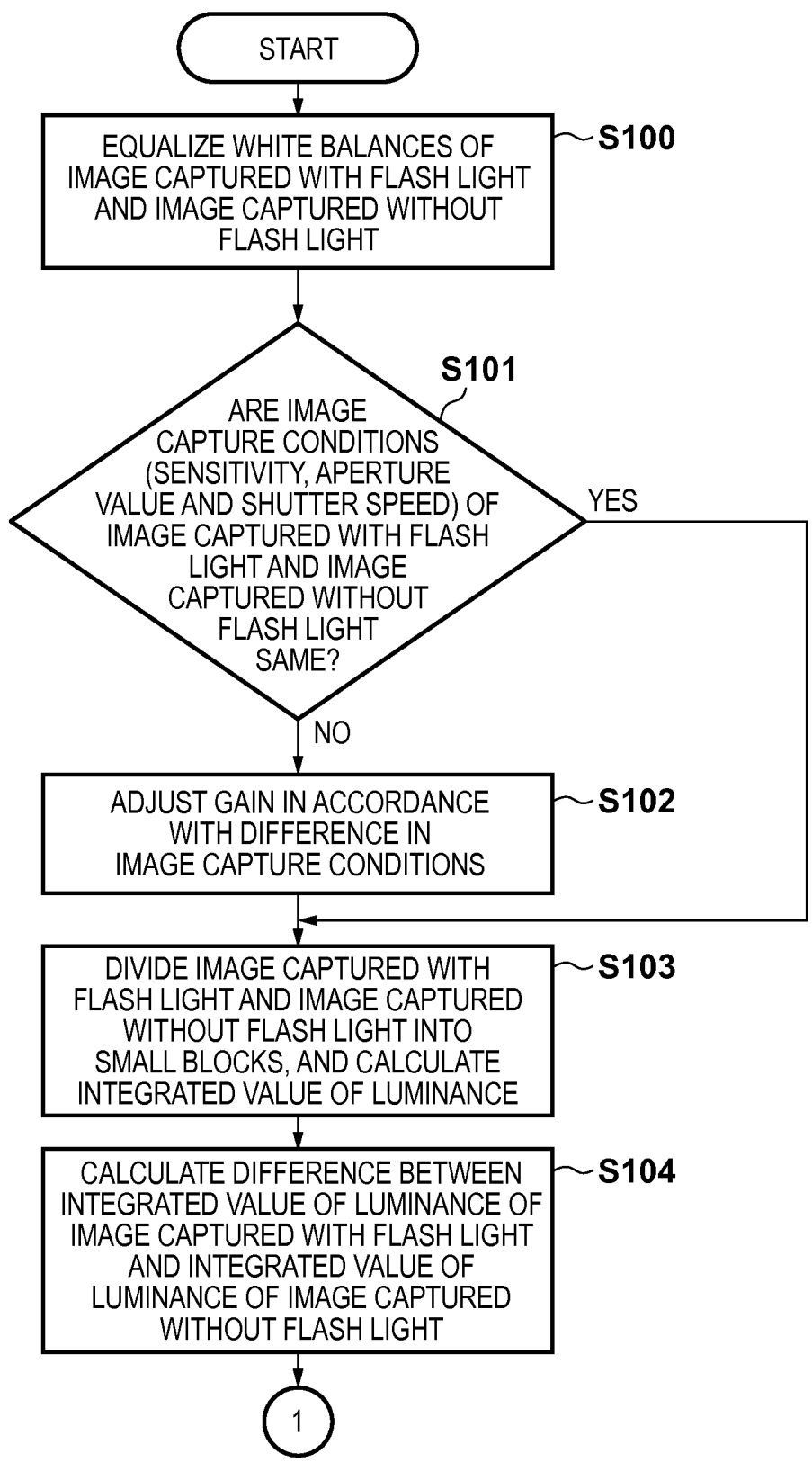
FIGS. 2A and 2B are flowcharts of the operations executed by an illuminated region detection circuit according to the first embodiment of the present invention.

Preferred embodiments of the present invention will now be described in detail in accordance with the accompanying drawings. The following embodiments describe an image capturing apparatus as one example of an image processing apparatus according to the present invention. It should be noted, however, that the present invention may adopt any acquisition method as long as it can acquire an image captured with flash light and an image captured without flash light that have captured the same scene. Therefore, an image capturing function is not indispensable in the present invention. Note that the same scene denotes overlapping of the fields of view at the time of image capture, and does not require the fields of view or the objects to perfectly match.

First Embodiment

FIG. 1 is a block diagram showing an example of a functional configuration according to signal processing of a digital camera, which is one example of an image processing apparatus according to the first embodiment of the present invention. In the present embodiment, an image captured while a flash (light emitting device) is emitting light (image captured with flash light) and an image captured while the flash is not emitting light (image captured without flash light) are aligned so they can be synthesized. In the present embodiment, illuminated regions that have been illuminated by flash light (with increased luminance due to the incidence of flash light) are detected from the image captured with flash light based on a degree of influence of the flash in relation to the integrated value of luminance of the image captured without flash light. Note that a flash refers to an auxiliary light source that has a light emitting time period of a few hundred microseconds to a few milliseconds and is composed of, for example, a xenon lamp. However, in the present embodiment, an image captured with flash light is not limited in this way, but can be interpreted similarly when an illumination source that keeps emitting light, such as an incandescent lamp, a fluorescent lamp and an LED, is used as the light emitting device. The following description of embodiments, including the present embodiment, provides an example in which a flash is used as the light emitting device. In the present embodiment, a description of processing that is ordinarily executed, such as aperture correction for correcting the influence of pixels having an aperture of a finite size, is omitted. It should be noted, however, that the implementation of processing that is not described in present embodiment shall not be excluded.

Referring to FIG. 1, an image capturing lens 10 is a group of lenses including a zoom lens and a focus lens. An image sensor 11 is constituted by a CCD image sensor, a CMOS image sensor and the like that convert an optical image into an electrical signal. An A/D converter 12 converts an analog signal output from the image sensor 11 into a digital signal. An image processing circuit 13 applies predetermined pixel interpolation, resizing processing such as size reduction, adjustment of white balance, color conversion processing, and the like to the digital signal (data) output from the A/D converter 12. The image processing circuit 13 obtains an image captured with flash light and an image captured without flash through the above processing.

Generally, the image captured with flash light and the image captured without flash are captured continuously. There is no particular restriction on an interval at which images are captured. Ordinarily, images are captured at an interval of a few seconds or less. It goes without saying that images may be captured at a longer interval in an environment where the influence of the outside light can be ignored, such as a studio. For example, the digital camera may be configured to, upon issuance of an instruction to capture images in an image capture mode for synthesizing images, capture an image with flash light and an image without flash light continuously. Examples of such an image capture mode may include a camera shake correction mode that makes use of image synthesis and a dynamic range increase mode (HDR mode). Although the present embodiment describes alignment of an image captured with flash light and an image captured without flash light, images to be synthesized are not limited to these two images.

The image processing circuit 13 stores the image captured with flash light in a flash image memory 14 and the image captured without flash light in a flash-free image memory 15. Based on the image captured with flash light stored in the flash image memory 14 and the image captured without flash light stored in the flash-free image memory 15, an illuminated region detection circuit 16 detects regions illuminated by flash light (illuminated regions) from the image captured with flash light. Note that in the present embodiment, an image is divided into a plurality of blocks, and regions illuminated by flash light are detected in units of blocks.

A misalignment detection circuit 17 detects misalignment between the image captured with flash light and the image captured without flash light for regions other than the regions (blocks) illuminated by flash light that have been detected by the illuminated region detection circuit 16. A misalignment correction circuit 18 corrects the misalignment of (aligns) the image captured with flash light and the image captured without flash light using the result of the detection by the misalignment detection circuit 17.

The output from the misalignment correction circuit 18 is stored in a storage medium 30 after a record control unit 19 applies thereto, for example, predetermined compression and encoding processing. Alternatively, the output from the misalignment correction circuit 18 may be displayed on a display medium 31 after a display control unit 20 applies thereto, for example, resizing according to the resolution of the display medium 31 and gamma processing. Alternatively, the output from the misalignment correction circuit 18 may be output to the outside. The storage medium 30 may be a nonvolatile built-in memory, an attachable/detachable SD card, and the like. Although the display medium 31 uses liquid crystals, it may use other materials instead.

A light emitting unit 21 emits light when capturing images as auxiliary light used for capturing images. In the present embodiment, the light emitting unit 21 is a flash that emits light for a light emitting time period of a few hundred microseconds to a few milliseconds in accordance with image capture conditions such as the exposure and the movement of the objects.

A control unit 22 controls the above-described components of the camera via a bus.

A camera shake amount detection unit 101 includes a gyroscope and the like, and detects an amount of camera shake of the digital camera. The camera shake amount detection unit 101 is used in the fourth embodiment.

Figure 2B:
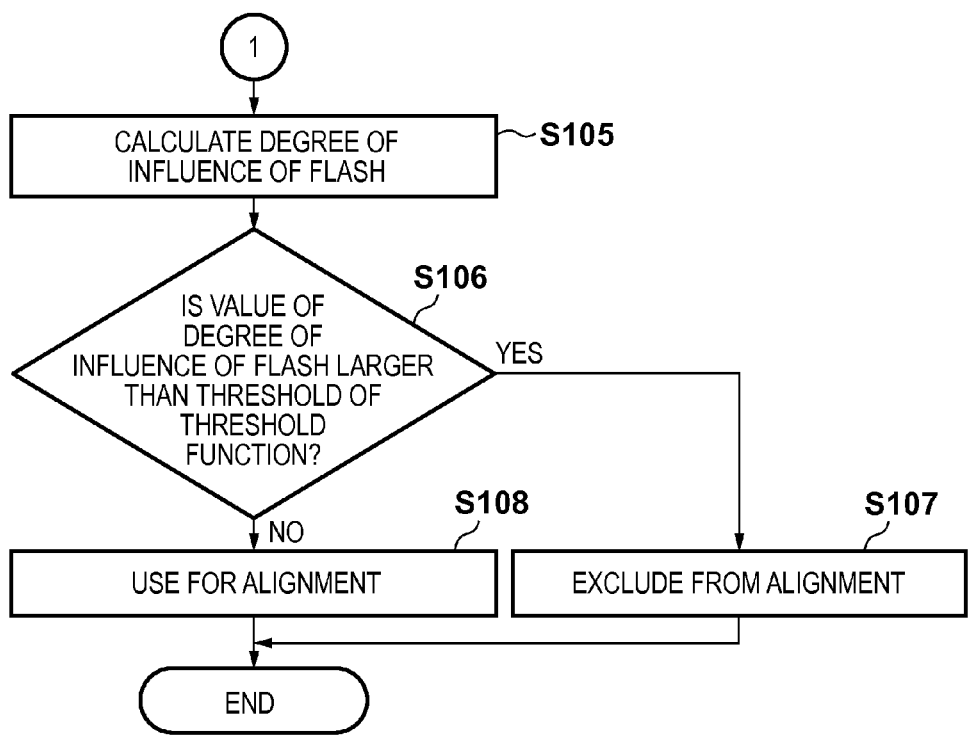

A description is now given of the operations of the illuminated region detection circuit 16 with reference to the flowcharts of FIGS. 2A and 2B. Note that a part or all of the illuminated region detection circuit 16 may be configured as hardware or software. Furthermore, a part of the following processing may be executed through an instruction or calculation by the control unit 22. Prior to the present processing, an image captured with flash light, which is an image captured while light is emitted by the light emitting unit 21, and an image captured without flash light, which is an image captured while light is not emitted by the light emitting unit 21, are obtained through an instruction from the control unit 22 in accordance with a predetermined program diagram, and are stored in the flash image memory 14 and the flash-free image memory 15, respectively. Note that the image captured with flash light may be an image obtained by image capture using light emitted by any external light emitting device that is not provided in the camera. Alternatively, an image captured with flash light and an image captured without flash light that have been obtained from another camera and the like may be stored in the flash image memory 14 and the flash-free image memory 15, respectively.

In S100, by using one of the image captured with flash light and the image captured without flash light as a reference, the illuminated region detection circuit 16 equalizes the white balances of these images.

In the case where the image capture conditions (e.g. sensitivity, an aperture value and a shutter speed) of the image captured with flash light differ from the image capture conditions of the image captured without flash light, the illuminated region detection circuit 16 performs gain adjustment in S101 and S102 so as to offset the difference in the image capture conditions. For example, assume the following image capture conditions: the image captured with flash light and the image captured without flash light were captured with the same sensitivity and the same aperture value, but the shutter speed at which the former image was captured was one step faster than the shutter speed at which the latter image was captured. In this case, the illuminated region detection circuit 16 increases the gain of the image captured with flash light by one step. With respect to images captured by the digital camera itself, the settings of the image capture conditions at the time of image capture are stored and used. With respect to images captured by another camera and the like, the image capture conditions described in their headers and the like are read and used.

As a result of the process for equalizing the white balances (together with the gain adjustment process when there is a difference in the image capture conditions), the image captured with flash light and the image captured without flash light have the same luminance in the regions that have not been illuminated by flash light as long as there is no influence of misalignment and moving objects.

In S103, the illuminated region detection circuit 16 divides the image captured with flash light and the image captured without flash light into a plurality of blocks in a similar manner as shown in FIGS. 3A and 3B. FIG. 3A shows the image captured with flash light, and FIG. 3B shows the image captured without flash light. In FIG. 3A, regions with dot hatching have been illuminated by intense flash light, and regions with line hatching have been illuminated by weak flash light. The illuminated region detection circuit 16, which serves as a luminance calculation unit, calculates a luminance value, more specifically the integrated value of luminance, on a per-block basis for each of the image captured with flash light and the image captured without flash light.

In S104, the illuminated region detection circuit 16 calculates a difference between the integrated value of luminance of each block in the image captured with flash light and the integrated value of luminance of the corresponding block in the image captured without flash light.

Furthermore, the illuminated region detection circuit 16, which also serves as an influence degree calculation unit, calculates a degree of influence of the flash (a degree of influence of light) defined as follows, with the integrated value of luminance of the image captured with flash light considered as $Itg\_flash$, and the integrated value of luminance of the image captured without flash light considered as $Itg\_no\_flash$.

$$\text{Degree of influence of flash} = (Itg\_flash - Itg\_no\_flash)/Itg\_no\_flash$$

A degree of influence of the flash is a value representing the influence of light emitted by the flash on the integrated value of luminance (a rate of increase in luminance). By defining a degree of influence of the flash as a ratio of a difference between the image captured with flash light and the image captured without flash light to the image captured without flash light, the following problem can be suppressed: when the above-described difference becomes large due to noise and camera shakes in a region that is originally dark in the image captured without flash light, the corresponding region is erroneously determined as an illuminated region due to the difference.

In S105, the illuminated region detection circuit 16 calculates the degree of influence of the flash for each block position.

Figure 4A:
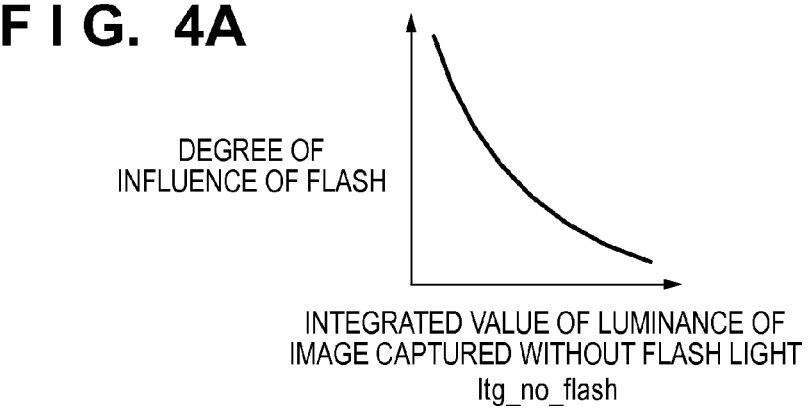
FIGS. 4A to 4C show examples of a threshold function of a degree of influence of a flash and an integrated value of luminance of an image captured without flash light in an embodiment of the present invention.

In S106, the illuminated region detection circuit 16 determines whether or not the degree of influence of the flash calculated for each block position is larger than a threshold corresponding to the value of $Itg\_no\_flash$, which is the integrated value of luminance of the image captured without flash light used for calculation of the degree of influence of the flash. FIG. 4A shows an example of a correspondence relationship between the value of $Itg\_no\_flash$, which is the integrated value of luminance of the image captured without flash light, and a threshold of the degree of influence of the flash (threshold function). As shown in FIG. 4A, the smaller the integrated value of luminance of the image captured without flash light (that is to say, the lower the brightness of the original image independent of flash light), the larger the threshold. In this way, a region exhibiting a small difference is not easily determined as an illuminated region. This is for suppressing the problem in which a region is erroneously determined as an illuminated region due to noise and camera shakes.

The illuminated region detection circuit 16 determines that a block in the image captured with flash light has been illuminated by flash light when the degree of influence of the flash calculated therefor is larger than the threshold corresponding to $Itg\_no\_flash$, which is the integrated value of luminance calculated for the corresponding block in the image captured without flash light.

The illuminated region detection circuit 16 excludes blocks that are determined as blocks that have been illuminated by flash light from the alignment (S107). More specifically, the misalignment detection circuit 17 does not detect motion vectors from the excluded blocks. When the degree of influence of the flash is equal to or smaller than the threshold, the corresponding block is determined as a block that has not been illuminated by flash light and is used for the alignment (S108).

Figure 4B:
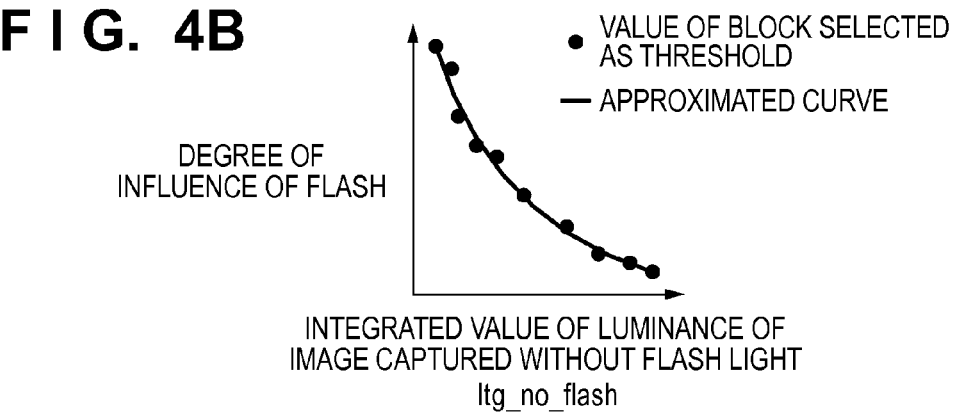

The threshold function can be calculated as follows. First, with the use of an image captured with flash light and a corresponding image captured without flash light that have been obtained in advance, the integrated value of luminance of the image captured without flash light and the degree of influence of the flash are calculated for each block position, and a plurality of blocks used as thresholds are selected. This operation is performed for a plurality of captured scenes. As shown in FIG. 4B, an approximated curve is calculated using the degrees of influence of the flash corresponding to the integrated values of luminance of the image captured without flash light in the blocks used as the thresholds, and this approximated curve is used as the threshold function. By using such a threshold function, blocks illuminated by flash light can be detected at high accuracy even when there were objects with high luminance in the background of a person and when the ground was illuminated by weak flash light.

FIGS. 5A and 5B show examples of the results of detecting the blocks illuminated by flash light in the illuminated region detection circuit 16 from the images shown in FIGS. 3A and 3B, respectively. In FIGS. 5A and 5B, the blocks that have been detected as the blocks illuminated by flash light are labeled "X".

A description is now given of the operations of the misalignment detection circuit 17. As one example of a method for detecting a motion vector, a point corresponding to the smallest sum of absolute differences (SAD) in luminance is calculated for each small block. In this way, a motion vector can be detected from each block. Misalignment can be corrected by applying mapping parameters calculated from the calculated motion vectors to the images. Here, the misalignment detection circuit 17 divides each image into blocks of an optional size, and calculates a motion vector for each pair of corresponding blocks by calculating a point corresponding to the smallest SAD in luminance, that is to say, the smallest sum of absolute values of differences in luminance values of corresponding pixels. Alignment (correction of misalignment) is performed using the calculated motion vectors.

In the present embodiment, the size of the blocks determined by the misalignment detection circuit 17 is the same as the size of the blocks for which the illuminated region detection circuit 16 calculates the integrated value of luminance. The misalignment detection circuit 17 calculates a motion vector for each block, except for the blocks that have been detected by the illuminated region detection circuit 16 as the blocks illuminated by flash light. As technology for calculating motion vectors by dividing images into blocks in the above manner is commonly known, a specific description thereof is omitted.

A description is now given of the operations of the misalignment correction circuit 18. The misalignment correction circuit 18 corrects misalignment using the motion vectors calculated by the misalignment detection circuit 17. The misalignment correction circuit 18 calculates mapping parameters from the plurality of motion vectors calculated in units of blocks using, for example, the affine transformation and the projective transformation. Technology for selecting motion vectors to be used in calculation of the mapping parameters from among a plurality of motion vectors is commonly known as described in, for example, Japanese Patent Laid-Open No. 2011-13890. A detailed description of such technology is omitted as the present invention may use any method. Misalignment is corrected by converting one image using the calculated mapping parameters. The image to which the mapping parameters are applied may be either the image captured with flash light or the image captured without flash light. For example, when the motion vectors are calculated from the image captured without flash light by using the image captured with flash light as a reference, misalignment can be corrected by applying the mapping parameters to the image captured without flash light.

The images in which the misalignment has been corrected can be synthesized in order to increase the dynamic range, correct camera shakes, and so on.

As has been described above, in the present embodiment, the degree of influence of the flash is adopted as a value representing the influence of light emitted by the flash on the integrated value of luminance (the rate of increase in luminance), and a relationship between the threshold of the degree of influence of the flash and luminance of the image captured without flash light is determined in advance. When the degree of influence of the flash calculated using the luminance of the image captured with flash light and the luminance of the image captured without flash light is larger than the threshold of the degree of influence of the flash corresponding to the luminance of the image captured without flash light, it is determined that an object in the image captured without flash light has been illuminated by flash light. In this way, whether or not an object has been illuminated by flash light is determined in consideration of the threshold corresponding to the luminance of the image captured without flash light in addition to a simple difference between the luminance of the image captured with flash light and the luminance of the image captured without flash light. Accordingly, the determination can be performed at high accuracy.

When aligning the image captured with flash light and the image captured without flash light, this determination is performed for each pair of corresponding blocks in both images. The blocks in the image captured with flash light that have been determined as the blocks illuminated by flash light are excluded from the processing for calculating motion vectors used for the alignment. As a result, the accuracy of calculation of motion vectors can be improved, thereby improving the accuracy of the alignment.

Second Embodiment

The following describes the second embodiment of the present invention. As opposed to the first embodiment, the present embodiment additionally includes a process for determining the illuminated regions (blocks that have been illuminated by flash light) based on a difference between the integrated value of luminance of the image captured with flash light and the integrated value of luminance of the image captured without flash light. The configurations according to the present embodiment are the same as those according to the first embodiment, except for the configuration of the illuminated region detection circuit 16. The explanations that have already been given in the first embodiment are omitted in the present embodiment.

Figure 6A:
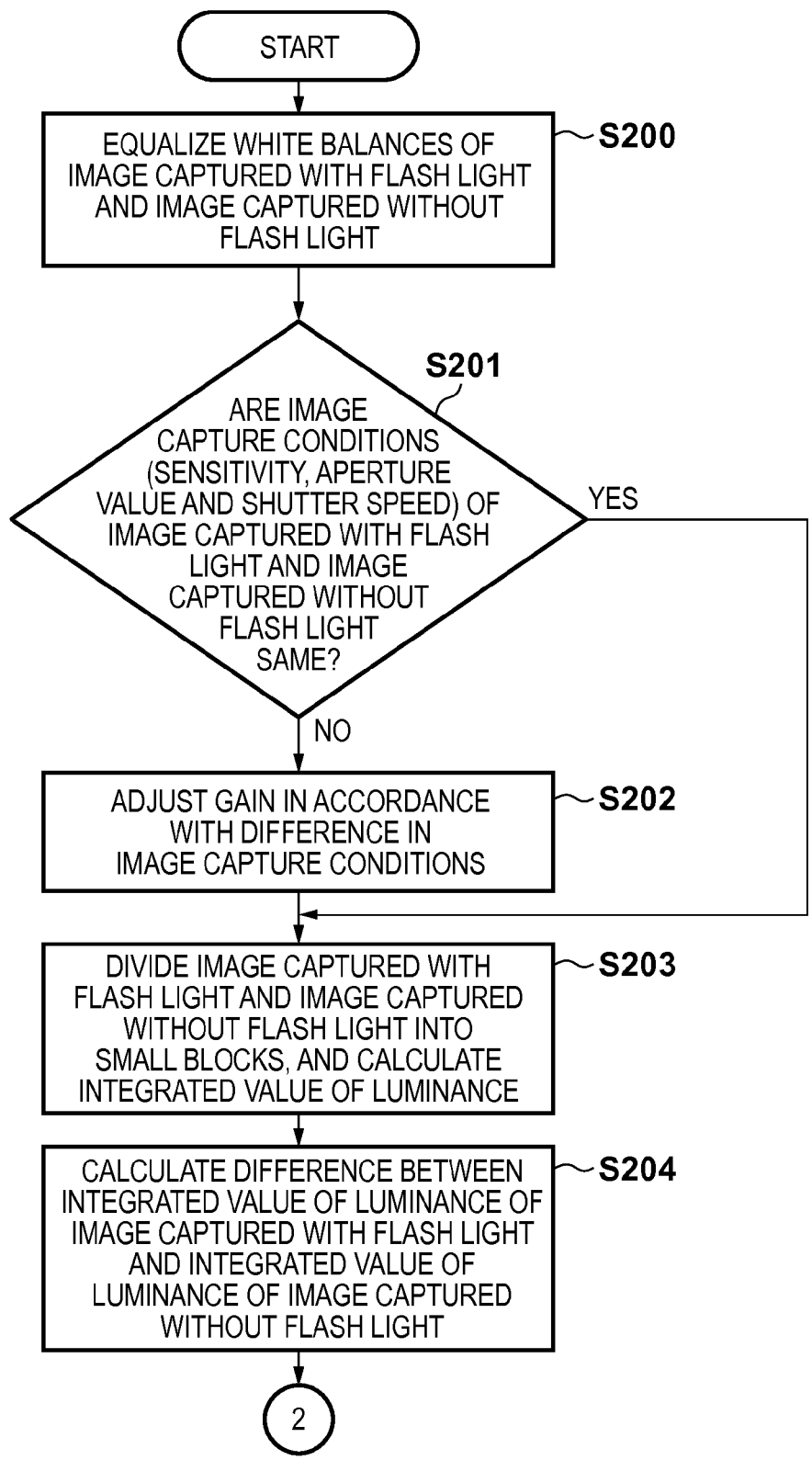
FIGS. 6A and 6B are flowcharts of the operations executed by an illuminated region detection circuit according to the second embodiment of the present invention.
Figure 6B:
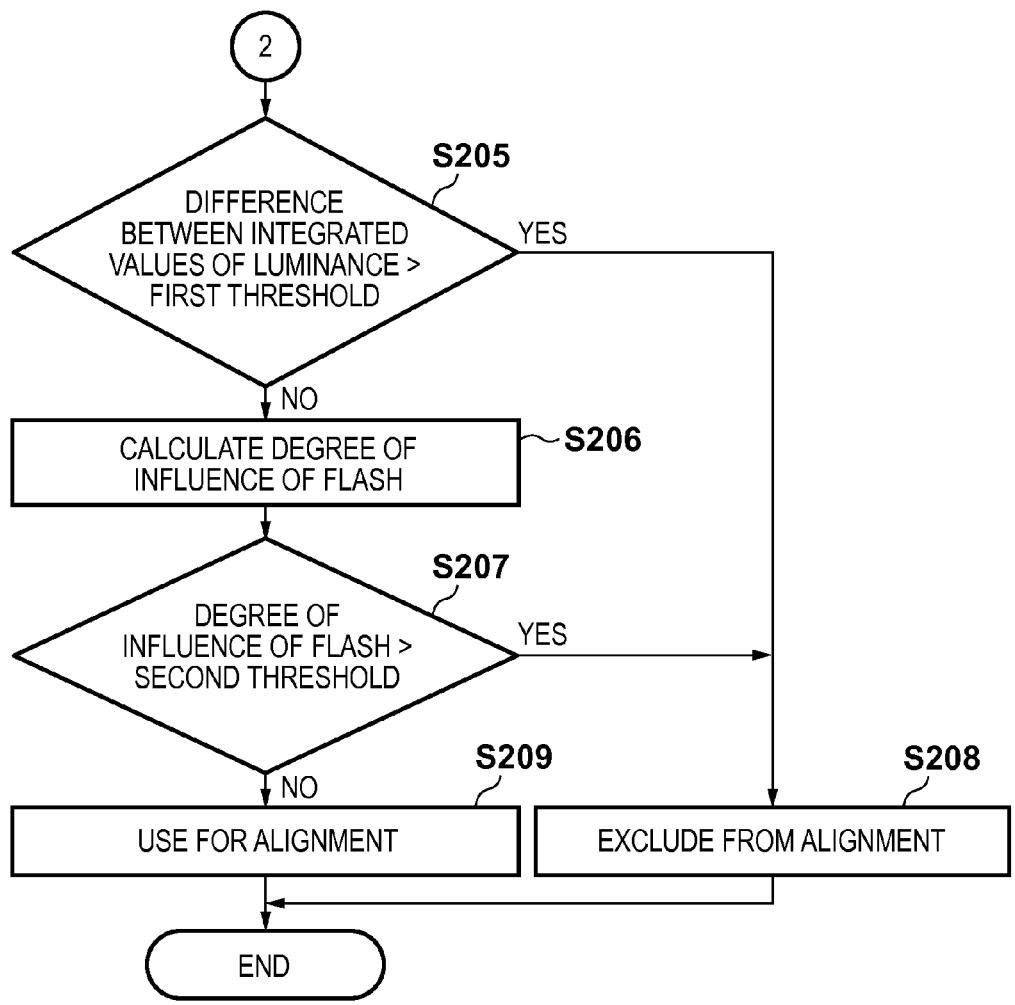

FIGS. 6A and 6B are flowcharts of processing executed by the illuminated region detection circuit 16 according to the present embodiment. The processes of steps S200 to S204 in FIG. 6A are similar to the processes of steps S100 to S104 in FIG. 2A described in the first embodiment, and therefore a description thereof is omitted.

In S205, the illuminated region detection circuit 16 compares, for each pair of corresponding blocks, the difference between the integrated value of luminance of the image captured with flash light and the integrated value of luminance of the image captured without flash light with a predetermined first threshold. When the difference between the integrated value of luminance of the image captured with flash light and the integrated value of luminance of the image captured without flash light is larger than the first threshold, the illuminated region detection circuit 16 determines that the block currently being processed is a block illuminated by flash light, and excludes this block from the alignment (S208). When the difference between the integrated value of luminance of the image captured with flash light and the integrated value of luminance of the image captured without flash light is equal to or smaller than the first threshold, the illuminated region detection circuit 16 calculates the degree of influence of the flash in a manner similar to S105 in the first embodiment (S206).

In S207, the illuminated region detection circuit 16 compares the degree of influence of the flash with a second threshold (corresponding to the threshold described in the first embodiment). When the degree of influence of the flash is larger than the second threshold, the illuminated region detection circuit 16 determines that the block currently being processed is a block illuminated by flash light, and excludes this block from the alignment (S208). When the degree of influence of the flash is equal to or smaller than the second threshold, the illuminated region detection circuit 16 determines that the block currently being processed is a block that has not been illuminated by flash light, and uses this block for the alignment (S209).

When the difference between the integrated values of luminance is sufficiently large, there is a high possibility that the corresponding blocks have been illuminated by intense flash light. Therefore, in the present embodiment, when the difference between the integrated value of luminance of the image captured with flash light and the integrated value of luminance of the image captured without flash light is larger than the first threshold, the block currently being processed is determined as a block illuminated by flash light without calculating the degree of influence of the flash. In this way, the processing is simplified. As a result, the speed of the determination process can be accelerated compared to the first embodiment.

Note that the degree of influence of the flash may be calculated even when the difference between the integrated value of luminance of the image captured with flash light and the integrated value of luminance of the image captured without flash light is larger than the first threshold.

Third Embodiment

A description is now given of the third embodiment of the present invention. In the present embodiment, the condition for calculating the degree of influence of the flash according to the second embodiment is changed. The configurations according to the present embodiment are the same as those according to the first embodiment, except for the configuration of the illuminated region detection circuit 16. The explanations that have already been given in the first embodiment are omitted in the present embodiment.

Figure 7A:
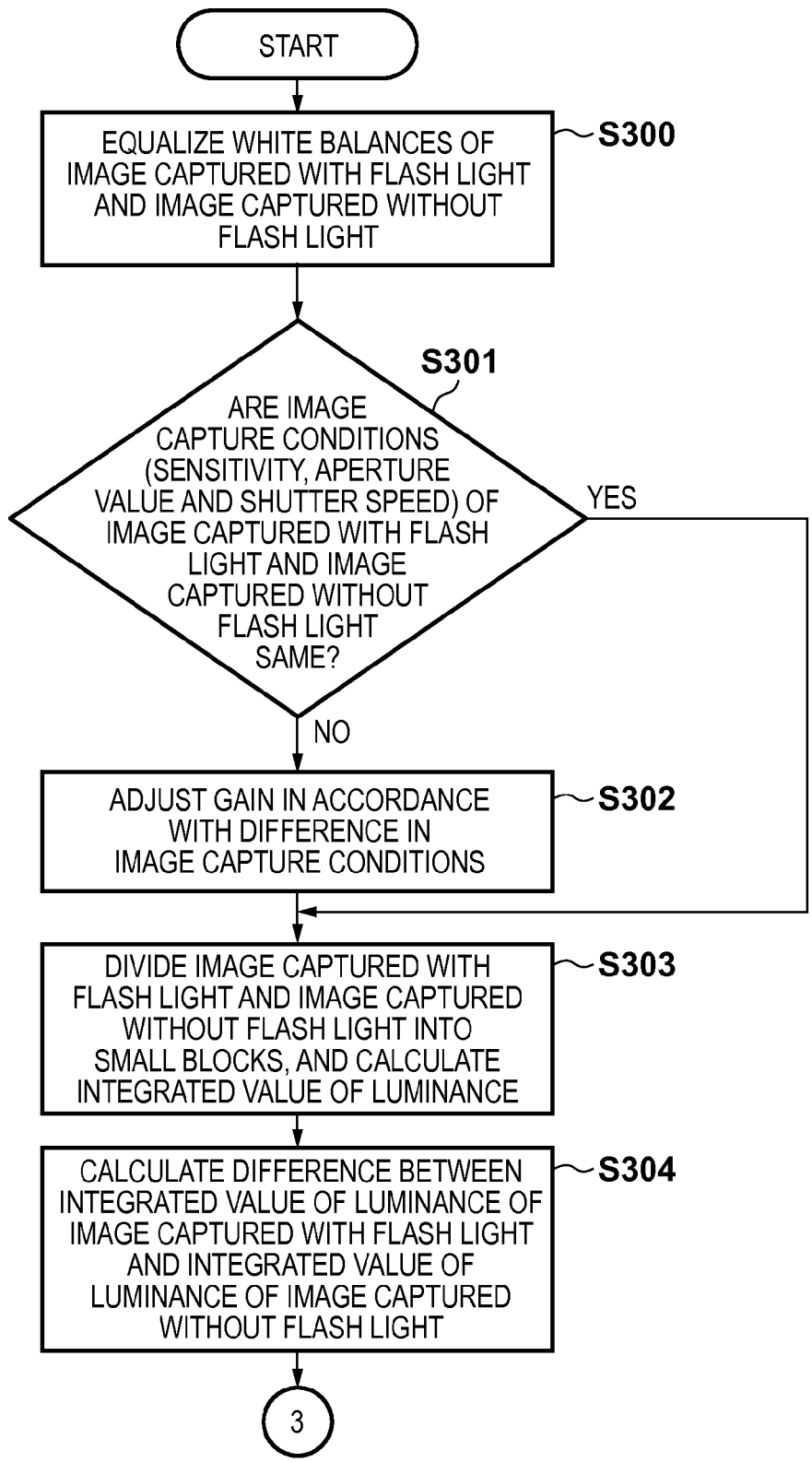
FIGS. 7A and 7B are flowcharts of the operations executed by an illuminated region detection circuit according to the third embodiment of the present invention.
Figure 7B:
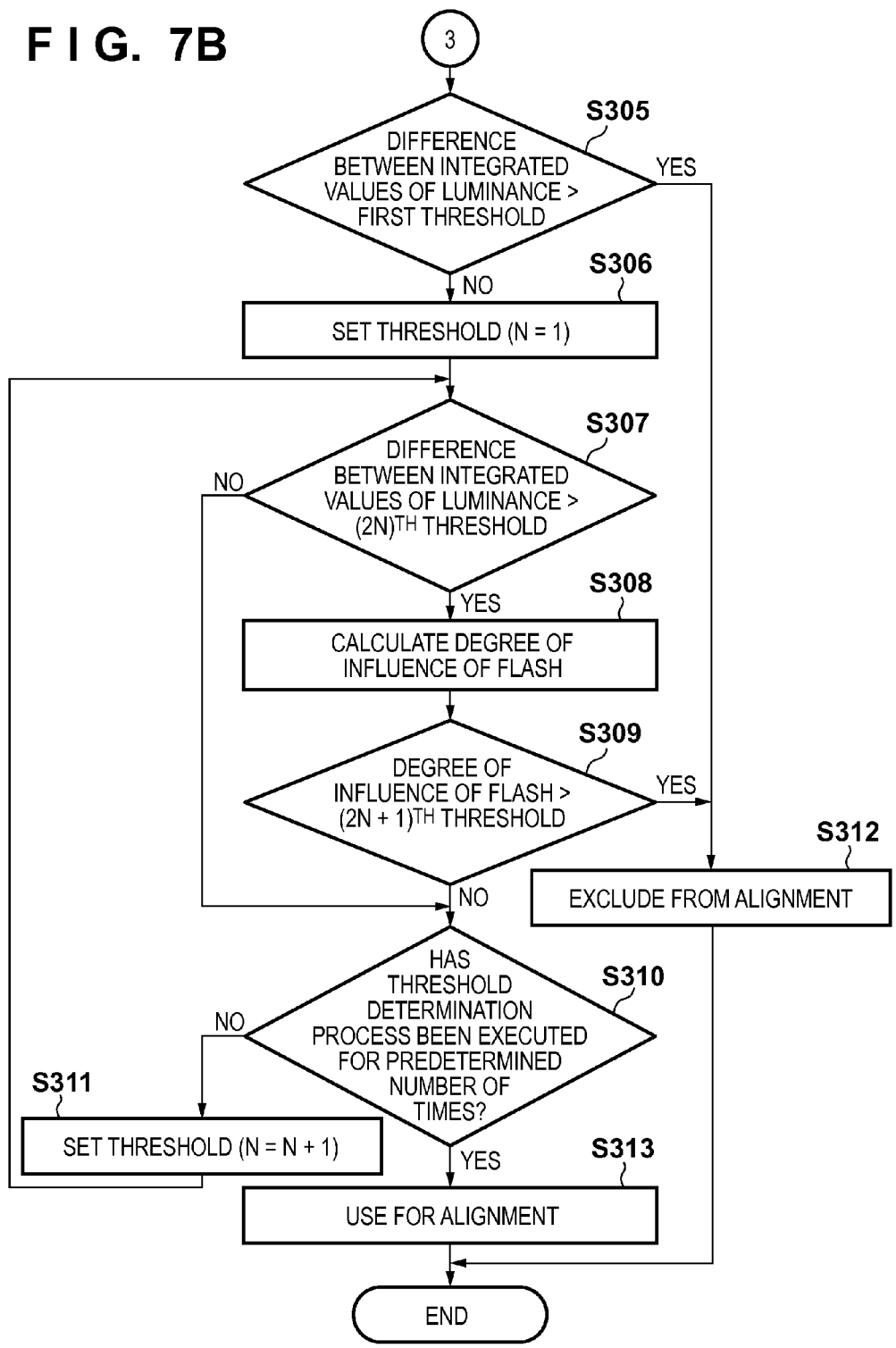

FIGS. 7A and 7B are flowcharts of processing executed by the illuminated region detection circuit 16 according to the present embodiment. The processes of steps S300 to S305 in FIGS. 7A and 7B are similar to the processes of steps S100 to S104 in FIG. 2A described in the first embodiment and the process of step S205 in FIG. 6B described in the second embodiment, and therefore a description thereof is omitted.

When the difference between the integrated value of luminance of the image captured with flash light and the integrated value of luminance of the image captured without flash light is equal to or smaller than a first threshold, the illuminated region detection circuit 16 repeats a process for comparing the difference between the integrated values of luminance with a threshold and a process for comparing the degree of influence of the flash with a threshold while changing each threshold.

In S306, the illuminated region detection circuit 16 sets a threshold (N=1) for the process for comparing the difference between the integrated values of luminance with a threshold and the process for comparing the degree of influence of the flash with a threshold. Note that, among the thresholds that are set here, the $(2N)^{th}$ threshold compared with the difference between the integrated values of luminance is a predetermined value smaller than the first threshold. The $(2N+1)^{th}$ threshold compared with the degree of influence of the flash is selected from a plurality of thresholds that have been prepared in advance in correspondence with the magnitudes of the $(2N)^{th}$ threshold. More specifically, the smaller the magnitude of the $(2N)^{th}$ threshold, the larger the $(2N+1)^{th}$ threshold.

The illuminated region detection circuit 16 compares, for each block, the difference between the integrated value of luminance of the image captured with flash light and the integrated value of luminance of the image captured without flash light with the $(2N)^{th}$ threshold (S307). When the difference between the integrated value of luminance of the image captured with flash light and the integrated value of luminance of the image captured without flash light is equal to or smaller than the $(2N)^{th}$ threshold, the illuminated region detection circuit 16 determines the number of times the threshold determination process has been executed (S310) as will be described later. When the difference between the integrated value of luminance of the image captured with flash light and the integrated value of luminance of the image captured without flash light is larger than the $(2N)^{th}$ threshold, the illuminated region detection circuit 16 calculates the degree of influence of the flash (S308).

In S309, the illuminated region detection circuit 16 compares the degree of influence of the flash with the $(2N+1)^{th}$ threshold. When the degree of influence of the flash is larger than the $(2N+1)^{th}$ threshold, the illuminated region detection circuit 16 determines that the block currently being processed is a block illuminated by flash light, and excludes this block from the alignment (S312).

On the other hand, when the degree of influence of the flash is equal to or smaller than the $(2N+1)^{th}$ threshold, the illuminated region detection circuit 16 determines that the block currently being processed is a block that has not been illuminated by flash light, and uses this block for the alignment (S313).

When the illuminated region detection circuit 16 determines in S310 that the threshold determination process has not been executed for a predetermined number of times, the illuminated region detection circuit 16 re-sets the threshold (S311). More specifically, the illuminated region detection circuit 16 increments N by one, sets a smaller threshold as the $(2N)^{th}$ threshold, and sets a threshold corresponding to this $(2N)^{th}$ threshold as the $(2N+1)^{th}$ threshold.

The result of determination as to whether or not each block has been illuminated by flash light is more accurate when the degree of influence of the flash is taken into consideration than when using only the difference between the integrated values. Changing the thresholds in accordance with the difference between the integrated values makes the result of determination much more precise and accurate. Therefore, in the present embodiment, the difference between the integrated values of luminance is compared with the $(2N)^{th}$ threshold while reducing the $(2N)^{th}$ threshold in a stepwise manner, and the determination is performed based on the degree of influence of the flash using the appropriate threshold corresponding to the extent of the difference between the integrated values. The extent by which the $(2N)^{th}$ threshold is reduced and a threshold used as the $(2N)^{th}$ threshold may be determined as appropriate in accordance with, for example, the characteristics of the image sensor and the flash.

When the illuminated region detection circuit 16 determines in S310 that the threshold determination process has been executed for the predetermined number of times, the illuminated region detection circuit 16 determines that the blocks that have not been determined as the blocks illuminated by flash light by then are the blocks that have not been illuminated by flash light, and uses these blocks in the alignment (S313).

As has been described above, the present embodiment can particularly improve the accuracy of determination regarding the blocks that have been illuminated by weak flash light by using a threshold of the degree of influence of the flash corresponding to the difference of the integrated values of luminance.

Fourth Embodiment

A description is now given of the fourth embodiment of the present invention. In the first to third embodiments, the size of the blocks based on which the integrated values of luminance are calculated for the detection of the illuminated regions is the same as the size of the blocks based on which the SADs of luminance are calculated for the detection of motion vectors (the same block division method). On the other hand, in the present embodiment, at least one of the block size and the threshold of the threshold function is changed in accordance with the amount of movement of the apparatus. The present embodiment is applicable to any of the first to third embodiments. Note that the explanations that have already been given in the first to third embodiments are omitted in the present embodiment.

Figure 8:
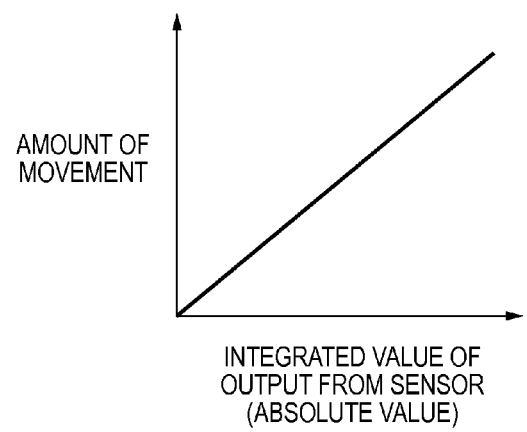
FIG. 8 shows a relationship between an integrated value of the output from a gyroscope in a camera shake amount detection unit included in a digital camera, which is one example of an image processing apparatus according to the fourth embodiment of the present invention, and an amount of camera shake.

The present embodiment makes use of the amount of movement detected by the camera shake amount detection unit 101. FIG. 8 shows one example of a relationship between the absolute value of the integrated value of the output from one of the three axes of a gyroscope that is included in the camera shake amount detection unit 101 as a sensor and the amount of movement. By thus integrating the values output from the camera shake amount detection unit 101, the amount of movement of the digital camera can be detected.

Figure 9A:
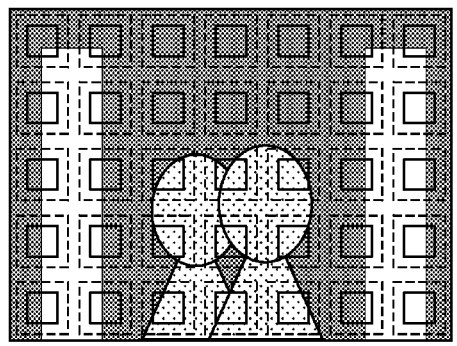
FIGS. 9A and 9B illustratively show the operations executed by an illuminated region detection circuit according to the fourth embodiment of the present invention.
Figure 9B:
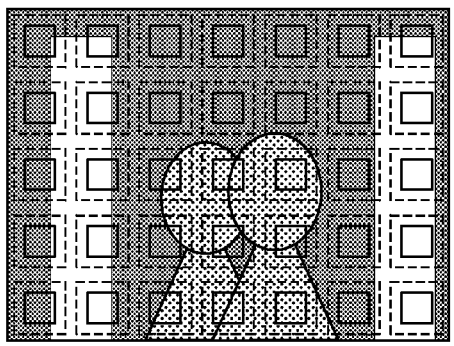

In the present embodiment, as shown in FIGS. 9A and 9B, the size of the blocks based on which the illuminated region detection circuit 16 calculates the integrated values of luminance (dotted line) is different from the size of the blocks based on which the misalignment detection circuit 17 calculates the SADs of luminance (solid line). It should be noted that a corresponding pair of the block drawn with a dotted line and the block drawn with a solid line is set so that the blocks are concentric. FIG. 9A shows the image captured with flash light, and FIG. 9B shows the image captured without flash light.

Although FIGS. 9A and 9B illustrate a space between any two neighboring blocks for convenience, no such space may exist in practice. For example, the block division according to the first to third embodiment may be applied to the blocks based on which the SADs are calculated, and the blocks based on which the integrated values of luminance are calculated may overlap the blocks based on which the SADs are calculated.

Figure 4C:
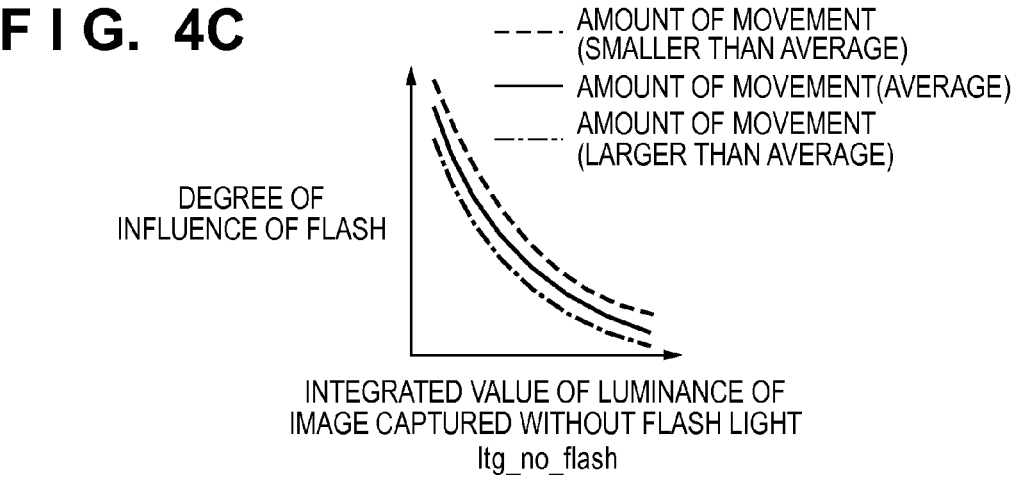

Furthermore, in the present embodiment, the illuminated region detection circuit 16 can change the size of the blocks based on which the illuminated region detection circuit 16 calculates the integrated values of luminance in accordance with the amount of movement detected by the camera shake amount detection unit 101 as shown in FIG. 10. The illuminated region detection circuit 16 can also change the threshold of the threshold function described in the first embodiment as shown in FIG. 4C and/or the thresholds described in the second and third embodiments. The illuminated region detection circuit 16 may change one or both of the block size and the thresholds.

FIG. 10 shows examples in which the size of the blocks based on which the illuminated region detection circuit 16 calculates the integrated values of luminance is changed in the case where the detectable amount of movement is categorized into three steps. Assume that the amount of movement is categorized into the amount of movement (large), the amount of movement (medium) and the amount of movement (small). The sizes depicted as 10a, 10b, and 10c in FIG. 10 correspond to the amount of movement (large), the amount of movement (medium) and the amount of movement (small), respectively. In FIG. 10, the size of the blocks 10a to 10c based on which the misalignment correction circuit 18 calculates the SADs of luminance is not changed, but the size of the blocks based on which the illuminated region detection circuit 16 calculates the integrated values of luminance is changed.

In FIG. 10, 10d shows an example in which the size of the blocks based on which the illuminated region detection circuit 16 calculates the integrated values of luminance is changed in proportion to the amount of movement. Here, the amount of movement in the vertical direction is Iv, and the amount of movement in the horizontal direction is Ih. Using the size of the blocks based on which the SADs of luminance are calculated as a reference, the blocks based on which the integrated values of luminance are calculated are increased by a size proportional to the amount of movement. The size by which the blocks are increased in the vertical direction is Lv, and the size by which the blocks are increased in the horizontal direction is Lh. Using a coefficient α, the blocks are increased by a size Lv=α×Iv and a size Lh=α×Ih.

FIG. 4C shows an example in which the threshold of the threshold function is changed in accordance with the amount of movement. In advance, an average value Im of the amounts of movement detected when a plurality of people captured images is calculated, and the threshold function based on the average value Im of the amounts of movement is determined. Assume that the amount of movement detected when capturing an image is $I=\sqrt{\{(Iv)^2+(Ih)^2\}}$, and a coefficient is β. The threshold of the threshold function can be changed by multiplying the threshold function based on the average value Im of the amounts of movement by β×Im/I, which serves as a weight.

Furthermore, the thresholds described in the second and third embodiments can be changed by multiplying them by β×Im/I in accordance with the amount of movement.

Figure 11A:
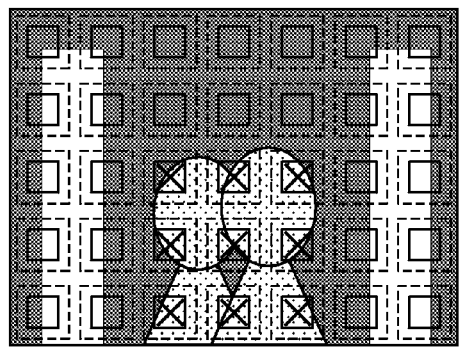
FIGS. 11A and 11B show examples of the results of detection by the illuminated region detection circuit according to the fourth embodiment of the present invention.
Figure 11B:
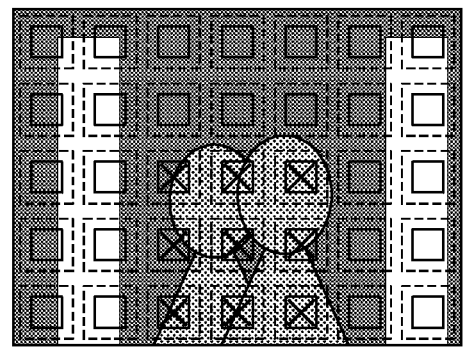
Figure 12A:
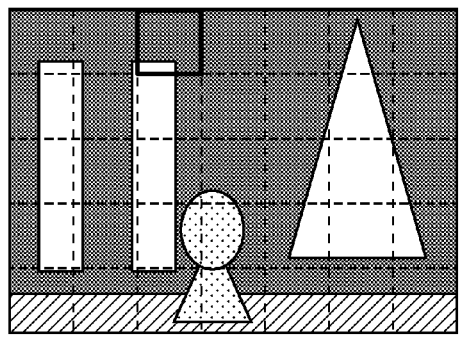
FIGS. 12A and 12B illustrate a problem in conventional detection of illuminated regions.
Figure 12B:
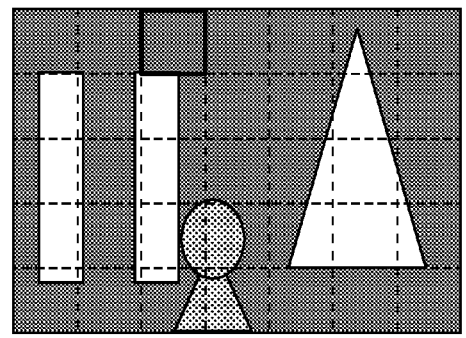

FIGS. 11A and 11B show the results of detecting the blocks illuminated by flash light in the illuminated region detection circuit 16 from the images shown in FIGS. 9A and 9B, respectively. In FIGS. 11A and 11B, the blocks that have been determined as the blocks illuminated by flash light are labeled "X".

With the present embodiment, the influence of changes in luminance due to misalignment caused by camera shakes can be reduced, and the accuracy of detection of the blocks illuminated by flash light can be improved.

In the above embodiments, the degree of influence of the flash for each block is obtained by dividing the difference between the integrated value of luminance of the image captured with flash light and the integrated value of luminance of the image captured without flash light by the integrated value of luminance of the image captured without flash light. However, the degree of influence of the flash may be changed as appropriate as long as it is based on the difference between the integrated value of luminance of the image captured with flash light and the integrated value of luminance of the image captured without flash light, because the value by which the difference is divided depends on a relationship with the threshold to be compared. For example, the difference between the integrated value of luminance of the image captured with flash light and the integrated value of luminance of the image captured without flash light may be used as the degree of influence of the flash, and it may be compared with a threshold based on the adjusted threshold function.

Furthermore, in the above embodiments, the threshold with which the degree of influence of the flash is compared is the function of luminance values of the image captured without flash light. However, the threshold is not limited in this way. Alternatively, the threshold may be the function of luminance values of the image captured with flash light.

In the above embodiments, the integrated value of luminance is calculated as the index for a luminance value for each block. However, the present invention is not limited in this way. For example, an average value, a median value, or a mode of luminance based on a histogram generated for each block may be calculated as the luminance value of each block in the above embodiments.

Furthermore, in the above embodiments, each image is divided into regions in the form of blocks as shown in FIGS. 9A and 9B in order to detect whether or not each region is an illuminated region. However, the method of dividing each image into regions is not limited in this way. For example, each image may be divided into regions having a shape other than a rectangular shape, or may be divided into regions according to the shapes of the objects that have been detected in advance. In this case, the regions may not have a uniform size, and therefore it is possible to, for example, weight the calculated value in accordance with each size.

Furthermore, in the above embodiments, the luminance value output from the image processing circuit 13 (Y signal out of YUV signals) is used for brightness comparison for each block. However, the present invention is not limited in this way. Alternatively, illuminated regions may be determined through brightness comparison by calculating the luminance values using a part or all of color component values (e.g. RGB) of images in the Bayer arrangement or the RGB values of pixels in images obtained after the interpolation processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-085889, filed on Apr. 4, 2012, which is hereby incorporated by reference herein its entirety.

What is claimed is:

1. An image processing apparatus comprising:
a processor; and
a memory storing instructions that, when executed by the processor, cause the image processing apparatus to function as:
an acquisition unit that acquires a first image captured with light emitted by a light emitting device and a second image captured without light emitted by the light emitting device;
a luminance calculation unit that calculates a luminance value of the first image and the second image, each of which has been divided into a plurality of regions, for each region;
an influence degree calculation unit that calculates, for each region in the first image, a degree of influence of light representing influence of light emitted by the light emitting device on the luminance value of the region;
an illuminated region detection unit that detects, from the first image, regions in which the degrees of influence of light are larger than a predetermined threshold as illuminated regions illuminated by light emitted by the light emitting device, wherein the predetermined threshold is determined for each region, and wherein the smaller the luminance value calculated for a region of the second image is, the larger the predetermined threshold for the region is; and
a misalignment correction unit that calculates mapping parameters based on motion vectors detected in regions in the first image other than the illuminated regions, and corrects misalignment between the first image and the second image by converting the first image or the second image using the mapping parameters.

2. The image processing apparatus according to claim 1, wherein the influence degree calculation unit calculates the degree of influence of light based on a ratio of a difference between the luminance value of the first image and the luminance value of the second image to the luminance value of the second image for each region.

3. The image processing apparatus according to claim 2, wherein the illuminated region detection unit detects regions in which a difference between the luminance value of the first image and the luminance value of the second image is larger than a predetermined threshold as the illuminated regions.

4. The image processing apparatus according to claim 3, wherein the influence degree calculation unit does not calculate the degrees of influence of light for the regions in which the difference between the luminance value of the first image and the luminance value of the second image is larger than the predetermined threshold.

5. The image processing apparatus according to claim 3, wherein a plurality of relationships between the luminance value of the second image and a threshold of the degree of the influence of light are prepared in accordance with a magnitude of the difference between the luminance value of the first image and the luminance value of the second image, and
calculation of the degree of influence of light by the influence degree calculation unit, and detection by the illuminated region detection unit, are executed in a stepwise manner in accordance with the magnitude of the difference between the luminance value of the first image and the luminance value of the second image.

6. An image capturing apparatus comprising:
an image processing apparatus comprising:
a processor; and
a memory storing instructions that, when executed by the processor, cause the image processing apparatus to function as:
an acquisition unit that acquires a first image captured with light emitted by a light emitting device and a second image captured without light emitted by the light emitting device;
a luminance calculation unit that calculates a luminance value of the first image and the second image, each of which has been divided into a plurality of regions, for each region;
an influence degree calculation unit that calculates, for each region in the first image, a degree of influence of light representing influence of light emitted by the light emitting device on the luminance value of the region;
an illuminated region detection unit that detects, from the first image, regions in which the degrees of influence of light are larger than a predetermined threshold as illuminated regions illuminated by light emitted by the light emitting device, wherein the predetermined threshold is determined for each region, and wherein the smaller the luminance value calculated for a region of the second image is, the larger the predetermined threshold for the region is; and
a misalignment correction unit that calculates mapping parameters based on motion vectors detected in regions in the first image other than the illuminated regions, and corrects misalignment between the first image and the second image by converting the first image or the second image using the mapping parameters;
an image capturing unit;
the light emitting device; and
a control unit that controls the image capturing unit and the light emitting device to obtain the first image and the second image through image capture.

7. A control method for an image processing apparatus, comprising:
acquiring a first image captured with light emitted by a light emitting device and a second image captured without light emitted by the light emitting device;
calculating a luminance value of the first image and the second image, each of which has been divided into a plurality of regions, for each region;
calculating, for each region in the first image, a degree of influence of light representing influence of light emitted by the light emitting device on the luminance value of the region;
detecting, from the first image, regions in which the degrees of influence of light are larger than a predetermined threshold as illuminated regions illuminated by light emitted by the light emitting device, wherein the predetermined threshold is determined for each region, and wherein the smaller the luminance value calculated for a region of the second image is, the larger the predetermined threshold for the region is;
calculating mapping parameters based on motion vectors detected in regions in the first image other than the illuminated regions; and
correcting misalignment between the first image and the second image by converting the first image or the second image using the mapping parameters.

8. The control method for the image processing apparatus according to claim 7, wherein the degree of influence of light is calculated based on a ratio of a difference between the luminance value of the first image and the luminance value of the second image to the luminance value of the second image for each region.

9. A non-transitory computer-readable storage medium storing a program, the program, when executed by a computer, causing the computer to function as an image processing apparatus comprising:
an acquisition unit that acquires a first image captured with light emitted by a light emitting device and a second image captured without light emitted by the light emitting device;
a luminance calculation unit that calculates a luminance value of the first image and the second image, each of which has been divided into a plurality of regions, for each region;
an influence degree calculation unit that calculates, for each region in the first image, a degree of influence of light representing influence of light emitted by the light emitting device on the luminance value of the region;
an illuminated region detection unit that detects, from the first image, regions in which the degrees of influence of light are larger than a predetermined threshold as illuminated regions illuminated by light emitted by the light emitting device, wherein the predetermined threshold is determined for each region, and wherein the smaller the luminance value calculated for a region of the second image is, the larger the predetermined threshold for the region is; and
a misalignment correction unit that calculates mapping parameters based on motion vectors detected in regions in the first image other than the illuminated regions, and corrects misalignment between the first image and the second image by converting the first image or the second image using the mapping parameters.

* * * * *